July 30, 1935.   I. POMIERANIEC   2,009,785
PLANTING MACHINE
Filed Oct. 13, 1931   2 Sheets-Sheet 1
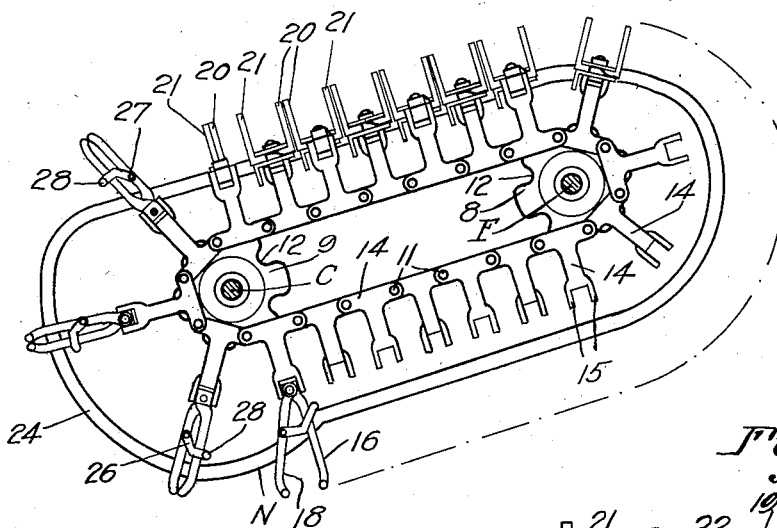
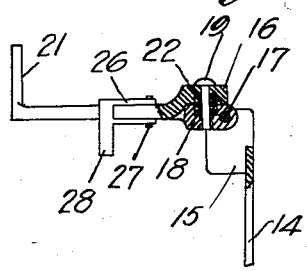
Inventor
I. Pomieraniec July 30, 1935.　　　I. POMIERANIEC　　　2,009,785

PLANTING MACHINE

Filed Oct. 13, 1931　　　2 Sheets-Sheet 2

Inventor

Isreal Pomieraniec

By Clarence A. O'Brien
Attorney

Patented July 30, 1935

2,009,785

UNITED STATES PATENT OFFICE 2,009,785

PLANTING MACHINE

Israel Pomieraniec, London, England, assignor to Transplanters (Holding Company) Ltd., London, England Application October 13, 1931, Serial No. 568,638 In Great Britain October 27, 1930

7 Claims. (Cl. 111—3)

This invention relates to improvements in planting machines and more particularly, but not exclusively, to machines for transplanting young shoots.

Planting machines have previously been proposed in which devices are carried by a wheel or disk or endless chain for example, and were adapted to receive the plant and carry them to the soil.

It is an object of the present invention to provide an improved planting machine having increased facilities for feeding the plants from both sides of the machine. Thus twice as many operators can be employed as can conveniently be employed in the usual type of planting machine. The danger of missing places in the series of plant carrying devices and so getting faulty spacing of the plants is thereby minimized.

According to the present invention, I provide a planting machine having devices for carrying the plants to the soil and in which the said devices are so arranged that they move in two separate rows at the plant receiving position and in a single row at the plant setting position.

Briefly, and in the preferred embodiment thereof the planting machine of the present invention includes an endless band or chain to which plant holding devices are pivoted in a manner to fall into alternate lateral plant reeciving position so as to form two rows when in plant receiving position, together with means for swinging the plant holding devices from the plant receiving position into a single row substantially in the vertical plane of motion of the endless band, as the latter moves, to deposit the plants in a single row.

The invention will be best understood from a study of the following description taken in connection with the accompanying drawings wherein:

Figure 1 is a side elevational view with parts omitted and illustrating an application of the invention.

Figure 2 is a fragmentary top plan view illustrating features of the invention hereinafter more fully referred to.

Figure 3 is a fragmentary detail view partly in section and partly in elevation illustrating the gripping device.

Figure 4:
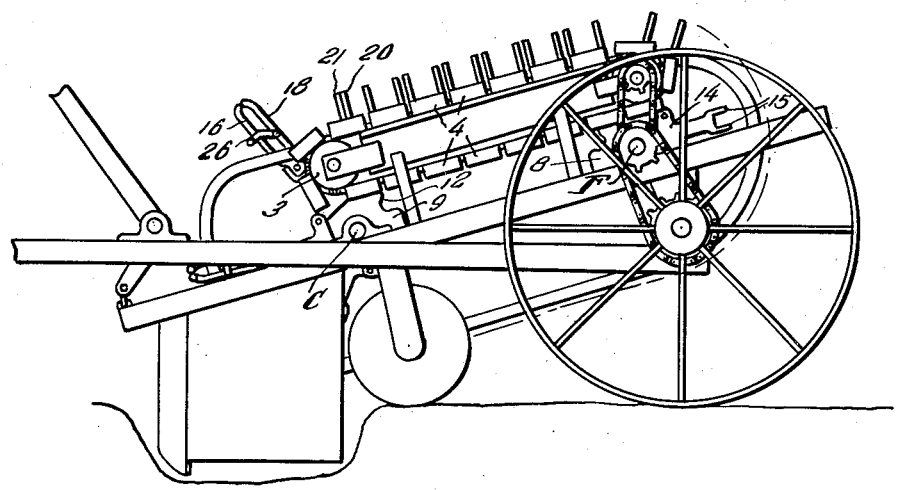
Figure 4 is a side elevational view of the planting machine.
Figure 5:
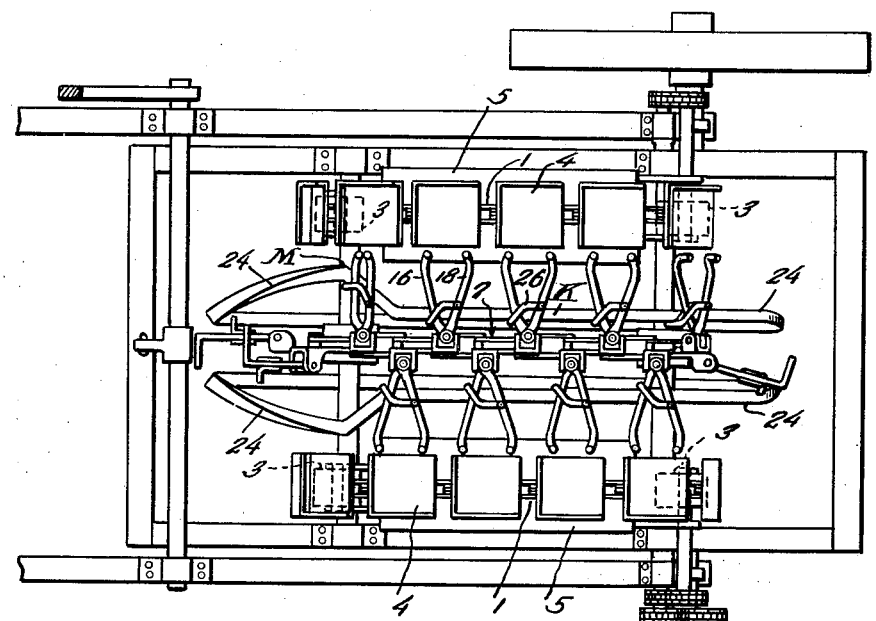
Figure 5 is a top plan view of the same.

Referring to the drawings by reference numerals it will be seen that a suitable wheel supported frame is provided, and suitably mounted within this frame are two endless parallel conveyors 1 to each of which are suitably secured an endless series of trays 4 as shown. The conveyors 1 are trained over driving wheels 3 mounted at the sides of the frame as best shown in Figure 4. Further these endless conveyors 1 move over oppositely disposed platforms 5 mounted at opposite sides of the frame between the rollers 3 as shown in Figure 5. Any suitable mechanism such as the chain and sprocket gearing illustrated in Figures 4 and 5 may be employed for driving the conveyors 1 from the traction wheels of the frame.

Mounted between the endless conveyors 1 is an endless band 7 trained over sprocket wheels 8 and 9 mounted on shafts C and F extending transversely of the frame. These shafts are driven by chain and sprocket means from the traction wheels as shown.

The band 7 is composed of a series of pairs of links 13, 14, the links of each pair being connected at their ends with the links of an adjacent pair by bolts or pins 11 engageable with the notches 12 of the wheels 8 and 9 for transmitting movement of the wheels to the endless band 7.

Further, and as best shown in Figure 3, each link 14 has extending in a plane normal thereto an arm merging into spaced parallel lateral projections 15.

Each gripping device includes a pair of arms including an arm 16 and an arm 18. As shown in Figure 3 the arm 18 has one end pivoted between the projections 15 as at 17 while the arm 16 has an end overlapping the pivoted end of the arm 18 and connected with said pivoted end of the arm 18 by a pivot pin 19 disposed at right angles to the pivot pin 17 to thereby permit lateral movement of the arm 16 relative to the arm 18. It will thus be seen that the arm 16 is capable of rotating about the pin 17 into a position either at right angles to the endless conveyor 7 or into a position substantially in the plane of movement of the conveyor 17.

It will be further noted that the arms 16 and 18 are not quite straight but are bowed somewhat so that their ends may come together. At their free ends, the arms 16, 18 are respectively provided with cooperating gripping jaws 20, 21 disposed substantially at right angles to the plane of relative movement of the arms 16, 18. At their pivoted ends the arms 16, 18 are enlarged and internally recessed to accommodate a spring 22 disposed about the pin 19. One end of the spring is secured to the arm 18 and the other end of the spring is secured to the arm 16. The spring is tensioned so as to normally hold the arm 18 closed upon the arm 16 so that the jaws 20, 21 are together in gripping position.

An angular U-shaped lever 26 straddles the arms 16 and 18 and at the open end of the U the sides of the lever are pivoted to the arm 18 as at 27. At the closed end of the U each lever 26 is provided with a depending projection 28 used in causing an opening or separation of the arms 16, 18 in a manner hereinafter more fully referred to, it being sufficient to note at this time that the depending portions 28 of the levers 26 bear against guide members 24.

Guides 24 are arranged at opposite sides of the endless band 7 and between the points K and L (Figure 2) each guide is straight and parallel with the endless conveyors 1 and 7 and are sufficiently close to the vertical plane through the endlesss conveyor to be laterally contacted by the guide pins or projections 28 in a manner to make use of these pins or projections 28 for normally retaining the arms 16 and 18 spread apart. From the point L onward to the point M the guides 24 extend in a direction away from the endless band 7 so as to relieve pressure on the depending extensions or pins 28 and thus permit the arms 18 to move toward the arms 16 for closing the gripping devices under action of the springs 22.

From the point M to the return bends the guides 24 converge inwardly so that with the projections 28 bearing against the inner sides of these portions of the guides the gripping devices are constrained to rotate about the pins 17 until they are parallel with and in substantial alignment with the endless conveyors.

When the pins or projections 28 engage the guides 24 at approximately the point N (Figure 1) said pins so cooperate with the guides as to cause a movement of the arms 18 of the gripping devices away from the arms 16 for opening the gripping devices and thus free the plants carried thereby in order that the plants may be deposited in the furrow.

The operation of the machine is as follows:

The machine is moved forward by any suitable motive power and as the machine moves forward drive is transmitted from the traction wheels to the endless conveyors 1 and 7. Normally the plant holding devices are disposed as shown in Figure 2 in alternate lateral plant receiving position with the jaws of the plant devices open or spread apart to receive the grip therebetween the plants lying on the trays 4.

As the machine and the endless bands move along the plant holding devices, in the manner previously explained, are caused to gradually close upon the plants and to swing from the lateral plant receiving position to a substantially vertical position, that is to say, to a position substantially in the plane of movement of the band 7, with the plants positively secured or held by the plant holding devices.

As the plant holding devices in a single row move downwardly with the band 7 toward the ground, the holding devices are successively opened in a manner hereinbefore explained for depositing the plants in a single row. Upon their return the gripping devices are gradually fully opened and fall into alternate lateral receiving position for repeating the cycle of operation just described.

In connection with the above it will be noted that although the plant holding devices are spaced relatively closely together along the upper run or stretch of the endless band 7 they are so spaced apart as they pass around the wheel 9 so as to insure the correct planting distances for the plants.

Having thus described the invention, what is claimed as new is:—

1. A planting machine including in combination an endless series of plant holding devices mounted to move in an endless path, said holding devices normally lying in lateral plant receiving position and movable from said lateral plant receiving position to a position substantially in the vertical plane of movement of the devices along said endless path, means connecting said devices for movement along said endless path and means for swinging said devices from said first position to the second named position incidental to a movement of said devices.

2. A planting machine as claimed in claim 1, and wherein the means connecting said devices consists of an endless band, supporting means for said band, and means for driving said band.

3. A planting machine including a frame, an endless carrier mounted thereon, plant holding devices pivoted thereto to fall into alternate lateral plant receiving position and means on said frame for converging said plant holding devices as the carrier moves, to deposit the plants in a single row.

4. A planting machine as claimed in claim 1, wherein the means connecting said devices consist of an endless band, supporting means for the band, means for driving the band, and said band having a plurality of arms, and means pivotally connecting said devices to the extremities of said arms.

5. A planting machine as claimed in claim 1 in which the plant carrying devices are carried by an endless band with a plurality of arms on the extremities of which the carrying devices pivot, and guides are provided for causing the plant carrying devices to swing inwardly at the forward part of the travel so that they assume a position substantially in the vertical plane of motion of the band and hang vertically at the lowest part of their travel.

6. A planting machine as claimed in claim 1 in which the plant carrying devices are carried by an endless band with a plurality of arms on the extremities of which the carrying devices pivot, and guides are provided for causing the plant carrying devices to swing inwardly at the forward part of the travel so that they assume a position substantially in the vertical plane of motion of the band and hang vertically at the lowest part of their travel; the said guides being so shaped and arranged as to maintain the gripping devices in laterally projecting position along the upper straight portion of their travel but to cause them to assume a position radial to the wheel over which the said band passes as they travel round the wheel and thereafter to return them to laterally projecting position.

7. A planting machine including a frame, an endless carrier mounted thereon, plant holding devices pivoted thereto to fall into lateral plant receiving position, and means on said frame for swinging the plant holding devices from said lateral plant receiving position to a position substantially in the vertical plane of motion of the carrier, as the carrier moves, to deposit the plants in a row.

ISRAEL POMIERANIEC.